(12) United States Patent
Chao et al.

(10) Patent No.: US 6,798,950 B2
(45) Date of Patent: Sep. 28, 2004

(54) INSTRUMENT AND METHOD FOR ALIGNING OPTICAL COLLIMATORS

(75) Inventors: Sheng-Jui Chao, Taichung (TW); Chih-Hsien Lin, Taichung (TW); Yuan-Kai Liu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 253 days.

(21) Appl. No.: 10/170,423

(22) Filed: Jun. 14, 2002

(65) Prior Publication Data

US 2003/0147587 A1 Aug. 7, 2003

(30) Foreign Application Priority Data

Feb. 5, 2002 (TW) ........................................ 91101952 A

(51) Int. Cl.[7] ................................................. G02B 6/32
(52) U.S. Cl. ....................................................... 385/34
(58) Field of Search ............................... 385/34, 33, 52, 385/61, 73, 78–79, 93, 136–137

(56) References Cited

U.S. PATENT DOCUMENTS

| 6,168,319 B1 | 1/2001 | Francis | |
| 6,590,658 B2 * | 7/2003 | Case et al. | 356/401 |
| 6,666,588 B1 * | 12/2003 | Thorsten et al. | 385/79 |
| 2002/0131699 A1 * | 9/2002 | Raguin et al. | 385/33 |
| 2002/0176092 A1 * | 11/2002 | Deck | 356/515 |

* cited by examiner

*Primary Examiner*—Diane I. Lee
(74) *Attorney, Agent, or Firm*—Browdy and Neimark, P.L.L.C.

(57) ABSTRACT

The present invention relates to an instrument and method of aligning a collimator. The instrument includes a frame base, a clamp, a first axis stage, a second axis stage, and a rack. A ferrule grasping a fiber therein is inserted in a glass tube, and the glass tube is secured to the frame base by the clamp. A pinion is fixedly mounted on one end of a GRIN lens, which is inserted in the glass tube, and engaged with the rack. The first axis stage moves the GRIN lens along the cylindrical axis of the glass tube, and the second axis stage rotates the GRIN lens around the cylindrical axis of the glass tube. When a light beam emitted from the collimator reaches the maximum intensity, the instrument of the invention accomplishes the alignment of the collimator.

13 Claims, 7 Drawing Sheets

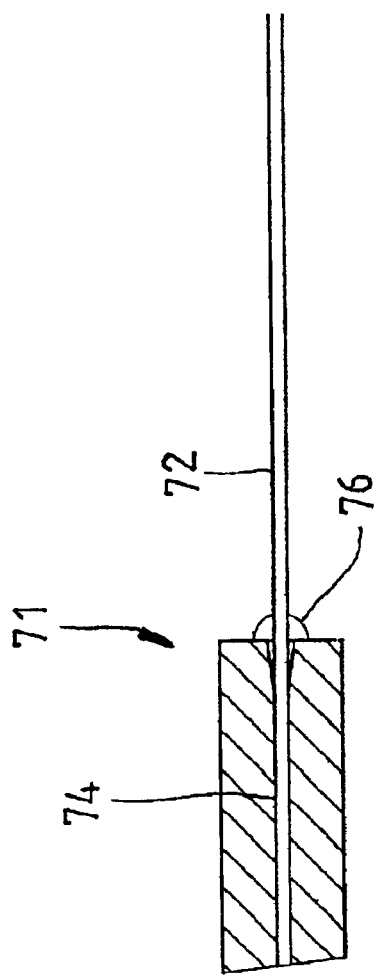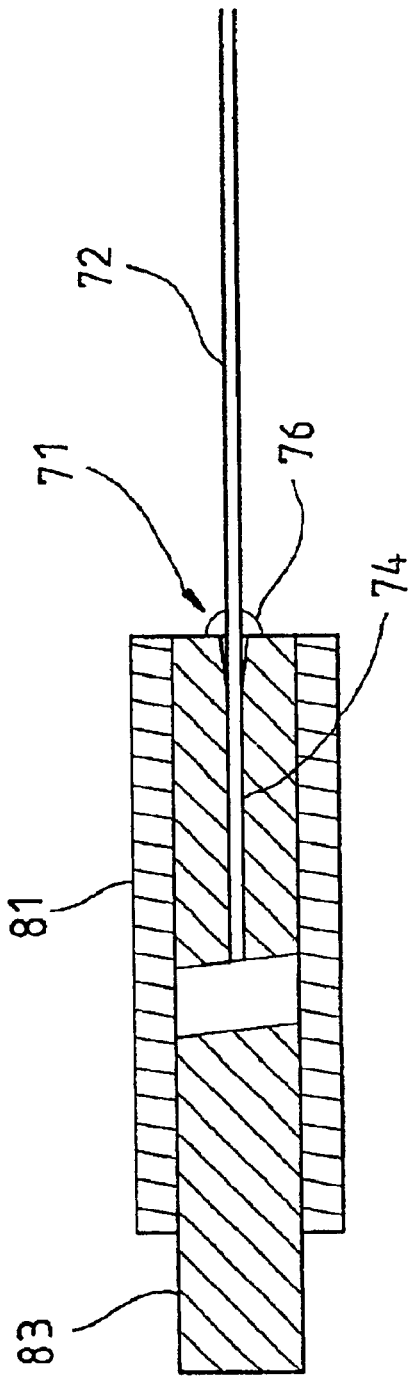

INSTRUMENT AND METHOD FOR ALIGNING OPTICAL COLLIMATORS

BACKGROUND OF THE INVENTION

1. Field of the Invention

The present invention relates generally to an instrument for aligning optical collimators.

2. Description of the Prior Art

U.S. Pat. No. 6,168,319 disclosed a system and method for aligning an optical fiber collimator. According to this prior art, as shown in FIG. 1, a glass ferrule 91 and a graded-index (GRIN) lens 92 are eventually bonded to the inside of a glass tube 90, and the glass tube is attached to a stationary fixture 95. A small amount of glue, such as a thermally curing epoxy, UV curing epoxy, is injected in the aperture 911 of the glass ferrule 91 and spread between the glass tube 90 and the glass ferrule 91. An optical fiber 912 inserted in the aperture 911 of the glass ferrule 91 is connected with a laser 93 and fixed to a one-dimensional stage 913 providing motion for it and the ferrule 91 along the direction of the cylindrical axis of the glass tube 90 and the optical axis of the grasped fiber 912. During aligning the optical collimator, a detector 96 detects a signal, which travels through the fiber 912 and GRIN lens 92. Thereafter, the position of the ferrule/fiber is adjusted within the tube while the size of the resultant beam is measured at a fixed distance from the output of the GRIN lens by the detector 96. When the detector 96 obtains an optimum beam size, the ferrule 91 is bonded to the glass tube 90 by curing the glue.

However, in the prior art, the ferrule/fiber is merely adjusted by the one-dimensional stage, and moved along the direction of the cylindrical axis of the glass tube. Therefore, the ferrule/fiber cannot be adjusted in other dimension. For example, the ferrule/fiber cannot rotate around the cylindrical axis of the glass tube.

SUMMARY OF THE INVENTION

The object of the present invention is to provide an instrument and method for aligning optical collimators precisely, wherein the GRIN lens in the glass tube of each optical collimator is adjusted in two dimensions. The GRIN lens can be moved along the cylindrical axis of the glass tube and rotated around the cylindrical axis of the glass tube.

According to the object of the invention, the instrument for aligning optical collimators includes a frame base, a clamp, a first axis stage, a second axis stage and a rack. A ferrule grasping a fiber therein is inserted into a glass tube, and then the glass tube is fixed to the frame base by the clamp. A pinion is mounted on a GRIN lens, which is inserted in the glass tube, and engaged with the rack. The two stages respectively adjust the GRIN lens to align with the ferrule, wherein the first axis stage moves the GRIN lens along the cylindrical axis of the glass tube and the second axis stage rotates the GRIN lens around the cylindrical axis of the glass tube.

The invention has an advantage of precisely aligning the GRIN lens with the fiber held in the ferrule by adjusting the GRIN lens in two dimensions.

The invention has another advantage of increasing yield rate and productivity.

BRIEF DESCRIPTION OF THE DRAWINGS

The present invention can be more fully understood by reading the subsequent detailed description in conjunction with the examples and references made to the accompanying drawings, wherein:

FIG. 6A is a cross-section showing the ferrule grasping a fiber;

FIG. 6B is a cross-section showing the ferrule and GRIN lens inserted in a glass tube;

DETAILED DESCRIPTION OF THE INVENTION

Figure 1:
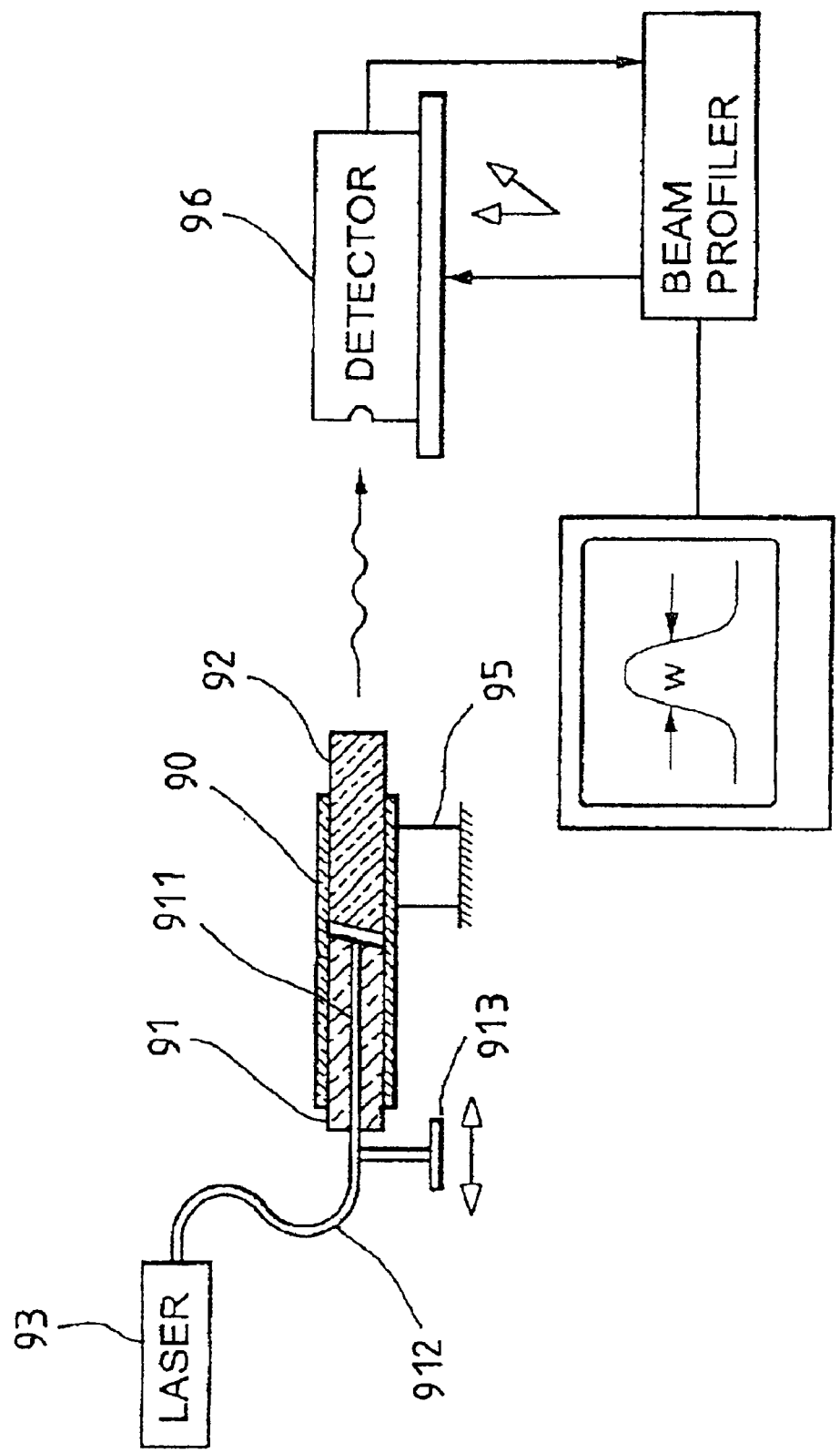
FIG. 1 is a schematic drawing showing a system for aligning optical fiber collimators according to U.S. Pat. No. 6,168,319.
Figure 2:
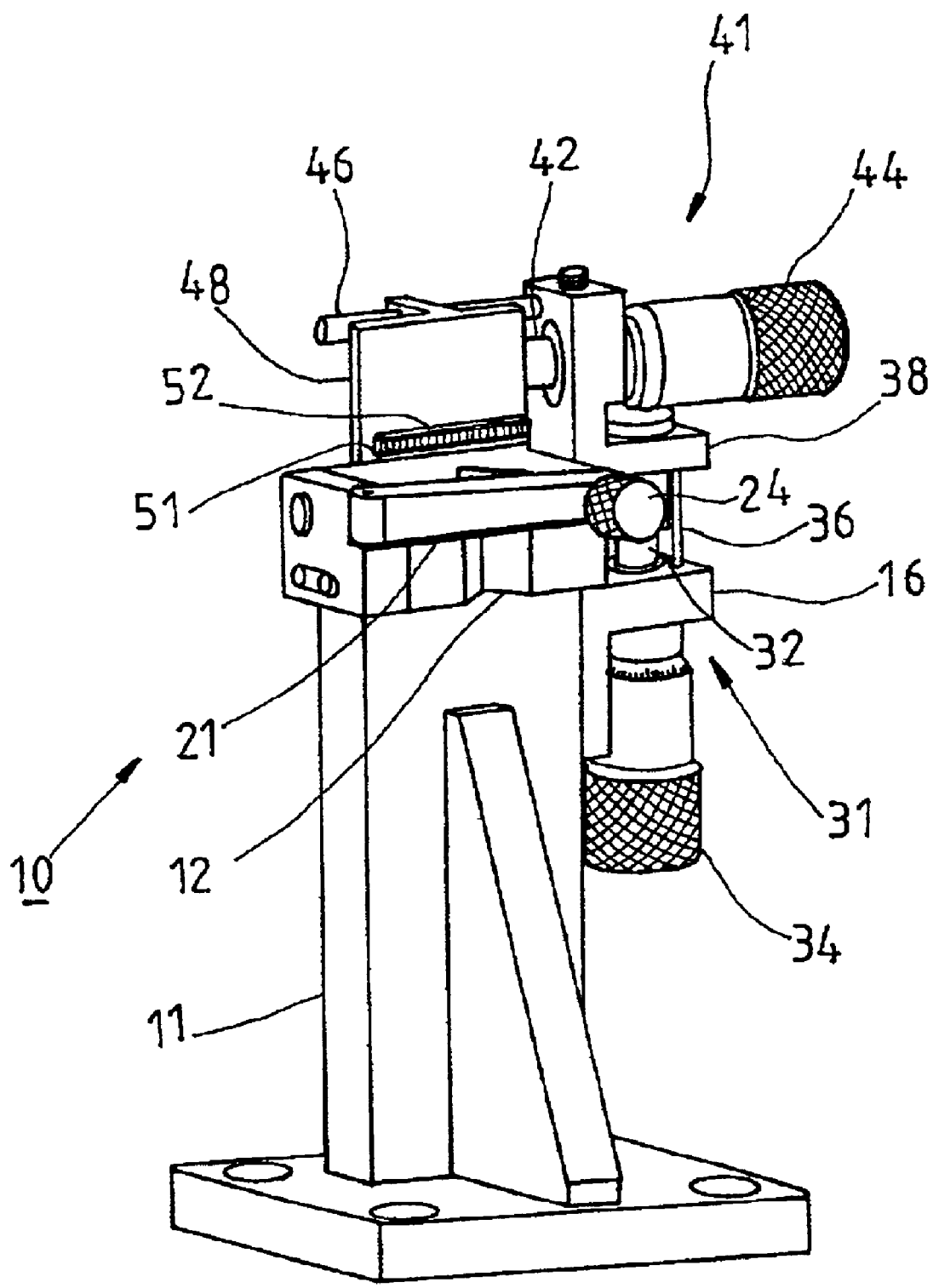
FIG. 2 is a three-dimensional diagram of an instrument for aligning optical collimators according to a preferred embodiment of the present invention.
Figure 4:
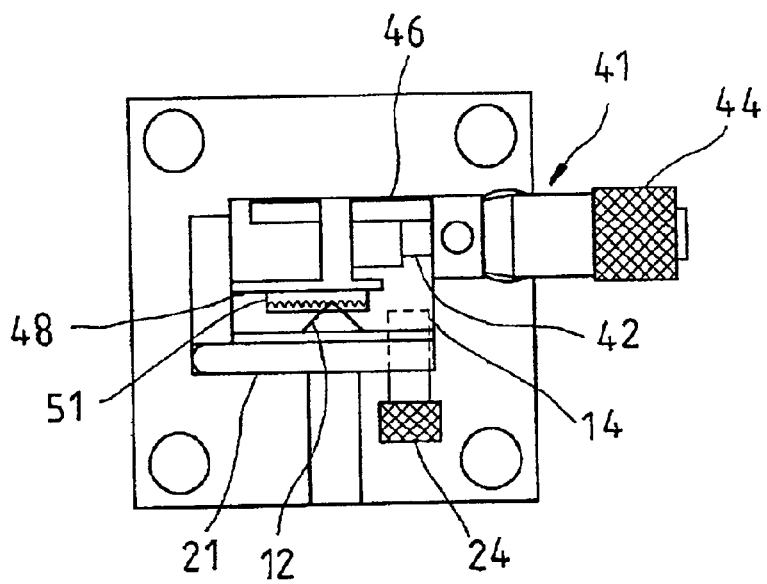
FIG. 4 is a top view of the instrument according to the preferred embodiment of the present invention.
Figure 3:
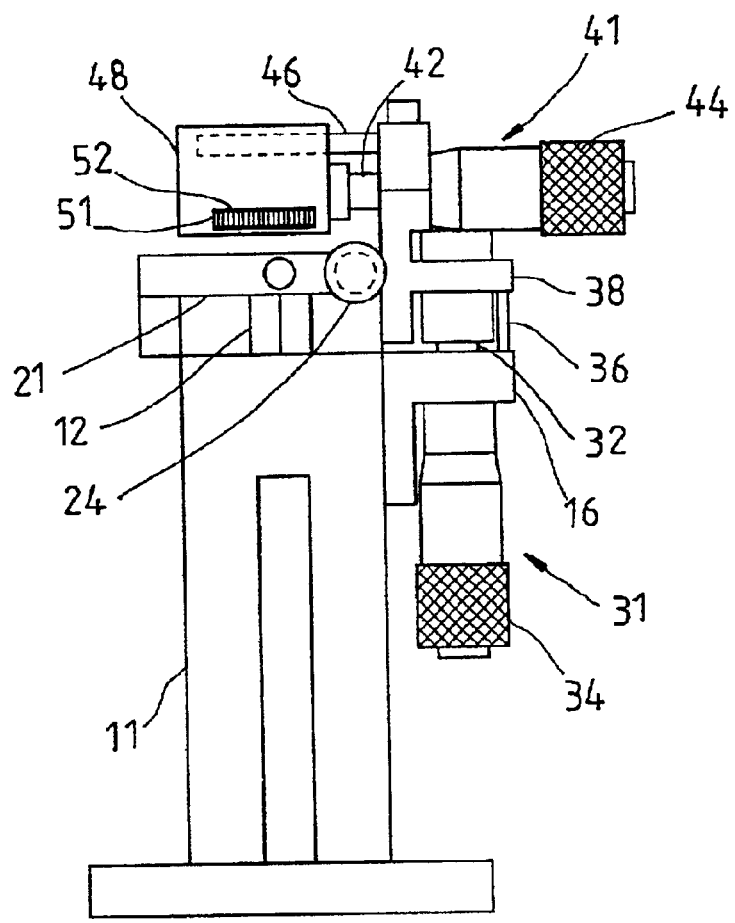
FIG. 3 is a side view of the instrument according to the preferred embodiment of the present invention.

Referring to FIGS. 2 to 4, an instrument 10 of the embodiment of the invention includes a frame base 11, a clamp, a first axis stage 31, a second axis stage 41 and a rack 51. The frame base 11 has a V-shaped notch 12 located at one end thereof and a screw hole 14 located beside the notch 12.

A rod 21 is positioned across the V-shaped notch 12, and one end of the rod 21 is selectively fixed to the frame base 11 by turning a screw 24 in the screw hole 14 or not. Thus, when the rod 21 is positioned across the V-shaped notch 12 and fixed to the frame base 11, the rod 21 and the V-shaped notch 12 constitute the clamp. The space of the clamp constituted by the notch 12 and the rod 21 can be adjusted by varying the depth of the screw 24 turned in the screw hole 14. When an optical collimator is positioned in the V-shaped notch 12, the collimator is clipped by the notch 12 and the rod 21. In the embodiment of the invention, another end of the rod 21 further has a pivot, which is fixed to the frame base 11. That is, the rod 21 can rotate around the pivot, if the screw 24 is not screwed in the screw hole 14.

The first axis stage 31 includes a first bracket 16, a first micrometer and a first guiding pillar 36, and is mounted on the frame base 11 by the first bracket 16. The first micrometer is combined with the first bracket 16, and has a first drive knob 34 and a first spindle 32, which is moved by turning the first drive knob 34.

The second axis stage 41 includes a second bracket 38, a second micrometer, a second guiding pillar 46 and a carrier 48, and is assembled with the first axis stage 31 by fixing the second bracket 38 to the first spindle 32. The second micrometer is combined with the second bracket 38, and has a second drive knob 44 and a second spindle 42 which is moved by the second drive knob 44. The carrier 48 is fixed to the second spindle 42. Thus, when the second drive knob 44 is turned manually or automatically, the carrier 48 is moved along the second axis, together with the second spindle 42. In addition, the second bracket 38 is fixed to the first spindle 32. When the first drive knob 34 of the first micrometer is turned manually or automatically, the first spindle 32 is moved along the first axis, together with the second axis stage 41. Therefore, when the first spindle 32 is moved along the first axis by turning the first drive knob 34 of the first axis stage 31, the carrier 48 of the second axis stage 41 is also moved along the first axis. In the embodiment of the invention, the first and second directions are perpendicular to each other.

In the embodiment of the invention, the first guiding pillar 36 penetrates the second bracket 38, and keeps the second axis stage 41 moving along the first axis rigidly. The second guiding pillar 46 penetrates the carrier 48, and keeps the carrier 48 moving along the second axis rigidly.

A rack 51 is fixedly positioned on the carrier 48, and has a pair of parallel ribs. The two ribs are respectively located on the longitudinal surfaces of the rack 51 and sandwiches the teeth of the rack 51. The rack 51 can be moved along the first axis by turning the first drive knob 34 of the first axis stage 31, and moved along the second axis by turning the second drive knob 44 of the second axis stage 41.

Figure 5:
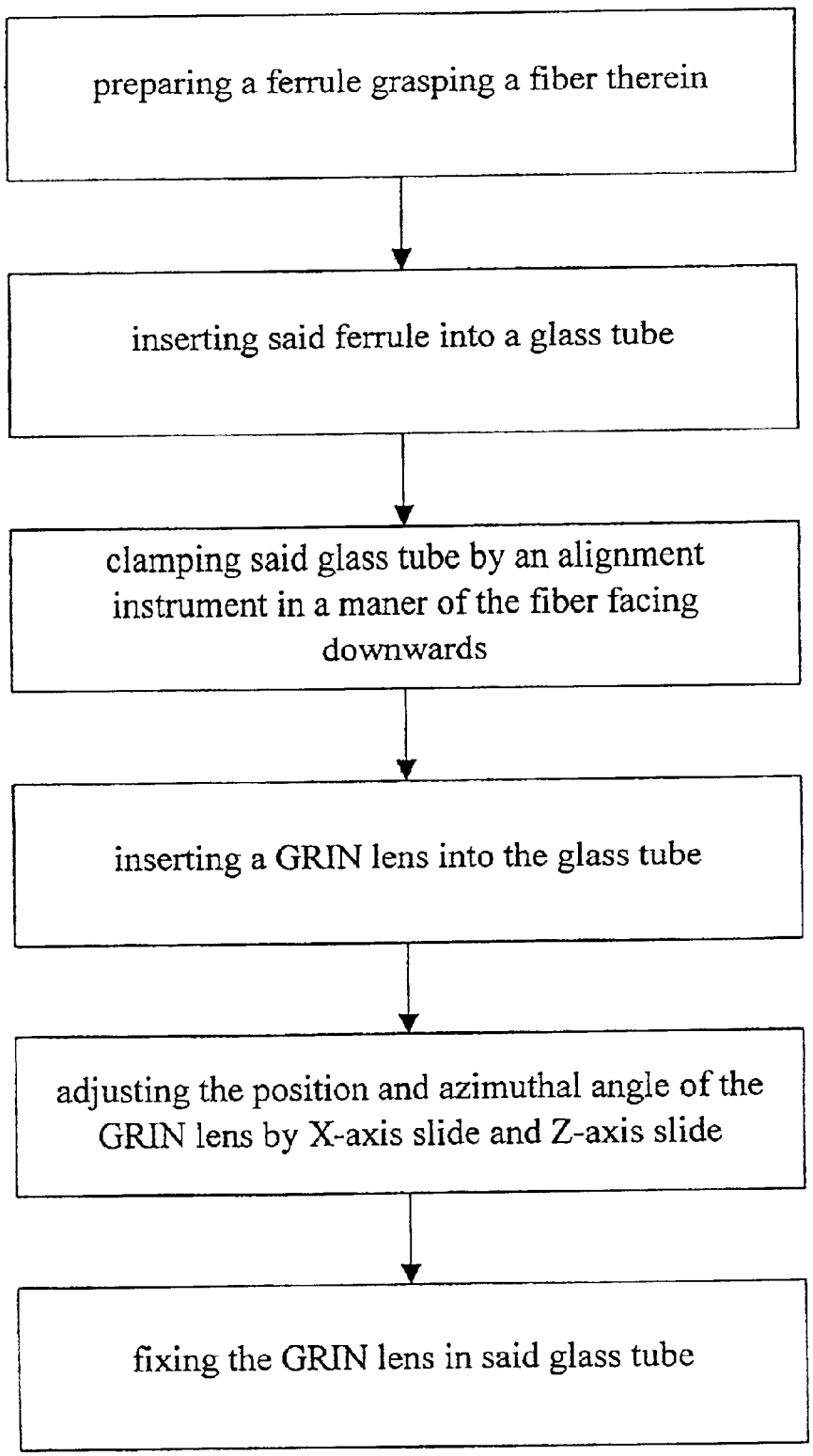
FIG. 5 is a flow chart illustrating the operation of the instrument according to the present invention.

Referring to FIG. 5, the method for aligning optical collimators is illustrated in the following steps.

Firstly, as shown in FIG. 6A, at least one fiber 72 is fixed in a hole 74 of the ferrule 71 by glue, and then the end surfaces of the ferrule 71 and fiber 72 are cleaved, ground and polished at a predetermined facet angle. The protrusion 76 surrounding on the other end surface of the ferrule 71 is the glue spilling from the hole 74.

Secondly, as shown in FIG. 6B, the ferrule 71 is inserted in a glass tube 81 and fixed therein by glue.

Figure 7:
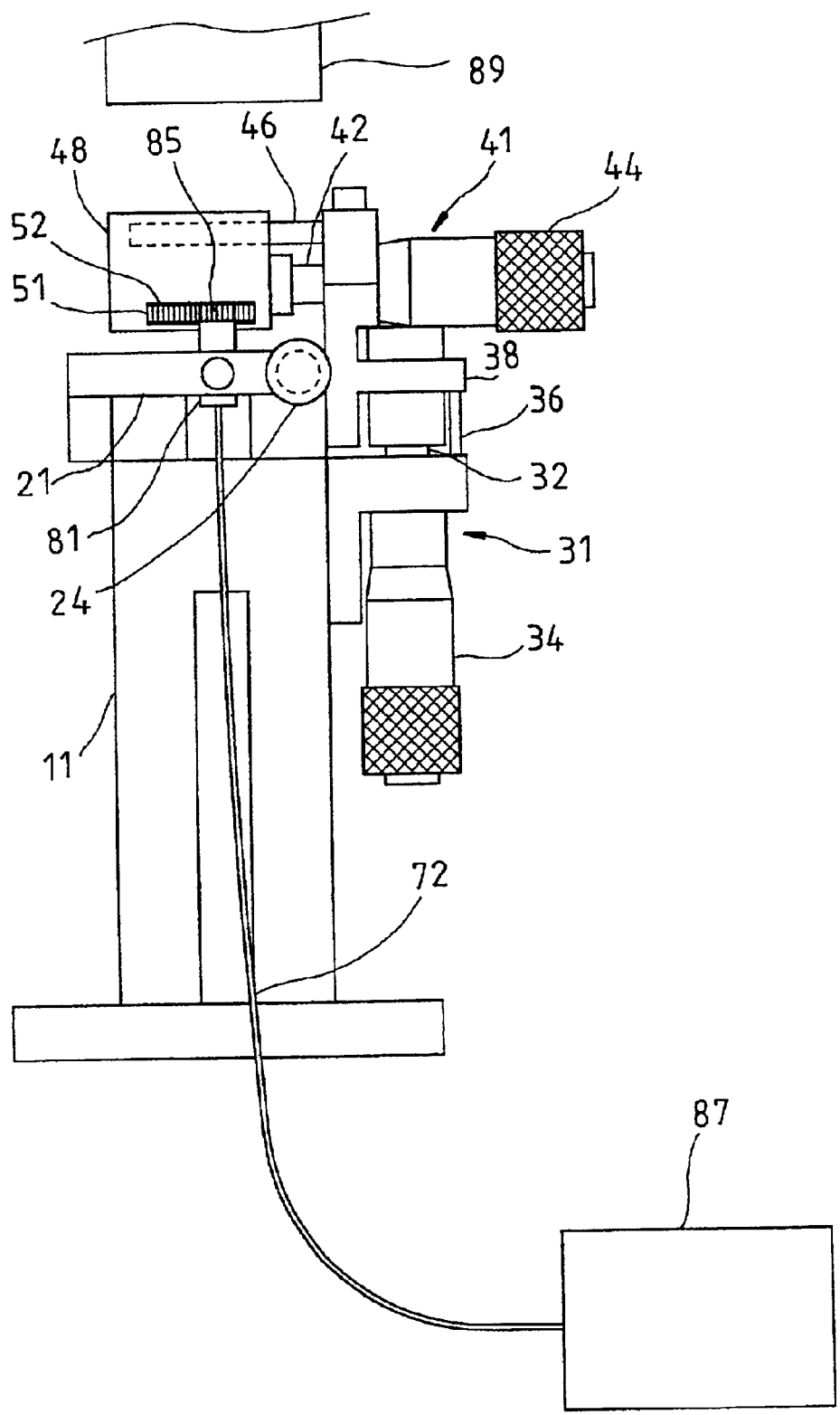
FIG. 7 is a schematic drawing of the instrument for aligning optical collimators according to the preferred embodiment of the present invention.

Next, as shown in FIG. 7, the glass tube 81 is clipped by the clamp. The glass tube 81 with the ferrule 71 is deposited in the V-shaped notch, and then the rod 21 is positioned across the V-shaped notch to clip the glass tube 81 by turning screw in the screw hole tightly.

Figure 8:
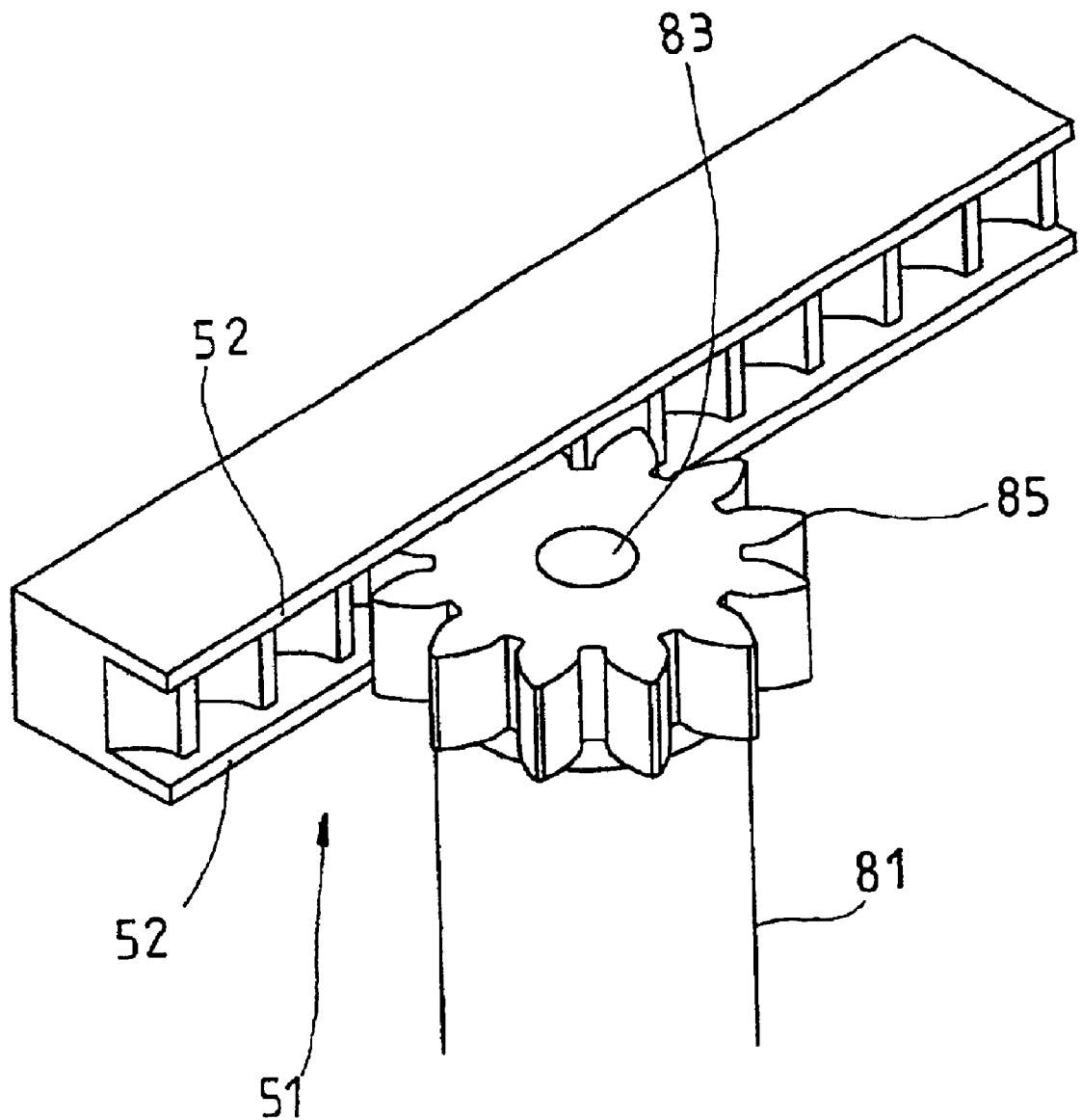
FIG. 8 schematically shows a pinion engaged with a rack.

Next, as shown in FIG. 8, the GRIN lens 83 having a pinion 85 is inserted in the glass tube 81. One end of the GRIN lens 83 for emitting light wears a pinion 85 and sticks out the glass tube 81. The glue is smeared on the sidewall of the GRIN lens 83, and then another end of the GRIN lens 83 for receiving light is inserted in the glass tube 81. The pinion 85, which is fixed to the GRIN lens 83, engages the rack 51, and is jammed in the two ribs 52.

Next, the GRIN lens 83 is aligned with the grasped fiber 72 by utilizing the first and second axis stages 31, 41. As shown in FIG. 7, the grasped fiber 72 is connected with a tuneable laser source 87, and a power meter 89 is applied to measure the light intensity, which is emitted from the GRIN lens 83. When the first drive knob 34 of the first micrometer of the first axis stage 31 is turned, the rack 51 drives the GRIN lens 83 to move along the first axis, wherein the first axis is parallel to the cylindrical axis of the glass tube. When the second drive knob 44 of the second micrometer of the second axis stage 41 is turned, the rack 51 drives the GRIN lens 83 to rotate around the cylindrical axis of the glass tube. In the embodiment of the invention, because the two ribs 52 of the rack 51 engages the pinion 85 mounted on the GRIN lens 83, the rack 51 is capable of driving the GRIN lens 83 to move along the cylindrical axis of the glass tube by turning the first micrometer of the first axis stage 31. Besides, because the rack 51 is moved along the second axis by turning the second micrometer of the second axis stage 41, the rack 51 is capable of driving the GRIN lens 83 to rotate around the cylindrical axis of the glass tube. Moreover, the distance between the GRIN lens 83 and the grasped fiber 72 is adjusted by moving the GRIN lens 83 along the cylindrical axis of the glass tube, when the rack 51 drives the GRIN lens 83 to move along the cylindrical axis of the glass tube. Two adjacent end surfaces of the GRIN lens 83 and the ferrule 71 rotate relatively, when the rack 51 drives the GRIN lens 83 to rotate around the cylindrical axis of the glass tube. When the power meter 89 obtains the maximum intensity of the beam emitted from the GRIN lens 83, the instrument accomplishes aligning the GRIN lens 83 with the grasped fiber 72.

After accomplishing the alignment of the optical collimator, the instrument clipping the glass tube 81 and fixing the position of the GRIN lens 83 relative to the grasped fiber 72 is delivered to a curing apparatus. In the curing apparatus, the glue exiting between the GRIN lens 83 and the glass tube 81 is cured.

The glue mentioned above is selected from one of the heat-curing epoxy and UV-curing epoxy. When the heat-curing epoxy is provided for the optical collimator, the curing apparatus is an oven. When the UV-curing epoxy is provided for the optical collimator, the curing apparatus is a UV-emitter.

In the embodiment of the invention, the rack 51 can be replaced with a pad. During aligning the optical collimator, the pad touches the GRIN lens 83 to rotate and move the GRIN lens 83.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An instrument for aligning an optical collimator having a glass ferrule grasping a fiber, a GRIN lens and a glass tube, wherein one end of the GRIN lens for emitting light beam mounts a pinion, said instrument comprising:

a frame base having a clamp for clipping the glass tube of the optical collimator;

a first axis stage fixed to the frame base and having a first spindle which moves along the first axis;

a second axis stage fixed to the first spindle of the first axis stage and having a second spindle which moves along the second axis, wherein the second axis is perpendicular to the first axis and the first axis is parallel to the cylindrical axis of the glass tube of the optical collimator; and a rack engaging the pinion and fixed to the second spindle of the second axis stage, wherein the first axis stage drives the second axis stage, rack and the GRIN lens to move along the first axis, so as to align the GRIN lens and the glass ferrule in the cylindrical axis of the glass tube, and the second axis stage drives the rack to move along the second axis and the rack drives the pinion to rotate around the cylindrical axis of the glass tube, so as to align the two adjacent end surfaces of the GRIN lens and the glass ferrule.

2. The instrument for aligning an optical collimator as claimed in claim 1, wherein the rack comprises a plurality of teeth and two parallel ribs which sandwiches the teeth.

3. The collimator for aligning an optical collimator as claimed in claim 1, wherein the clamp comprises a rod positioned across a V-shaped notch forming on the frame base.

4. The instrument for aligning an optical collimator as claimed in claim 3, wherein one end of the rod is selectively fixed to the frame base, and the other end of the rod has a pivot fixed to the frame base.

5. The instrument for aligning an optical collimator as claimed in claim 1, wherein the first axis stage further comprises a first bracket fixed to the frame base, a first micrometer having a first drive knob and the first spindle, and a first guiding pillar, wherein the first micrometer is combined with the first bracket and the first spindle is moved along the first axis by turning the first drive knob.

6. The instrument for aligning an optical collimator as claimed in claim 1, wherein the second axis stage further comprises a second bracket fixed to the first spindle, a second micrometer having a second drive knob and the second spindle, and a second guiding pillar, wherein the second micrometer is combined with the second bracket, and the second spindle is moved along the first axis by turning the first drive knob and moved along the second axis by turning the second drive knob.

7. The instrument for aligning an optical collimator as claimed in claim 1, further comprising a carrier fixed to the second spindle and mounting the rack.

8. The instrument for aligning an optical collimator as claimed in claim 7, wherein the first guiding pillar penetrates the second bracket and keeps the second axis stage moving along the first axis rigidly, and the second guiding pillar penetrates the carrier and keeps the carrier moving along the second axis rigidly.

9. A method for aligning an optical collimator by utilizing the instrument as claimed in claim 1, comprising the steps of:

clipping a glass tube of the optical collimator by the clamp, wherein a glass ferrule grasping a fiber is inserted in the glass tube;

inserting a GRIN lens wearing a pinion in the glass tube, wherein a rack of the instrument engages the pinion;

connecting the fiber of the optical collimator with a light source and measuring the light intensity emitted from the GRIN lens of the optical collimator fiber;

turning the first drive knob of the first micrometer of the first axis stage and the second drive knob of the second micrometer of the second axis stage, so as to move the GRIN lens along the cylindrical axis of the glass tube and rotate the GRIN lens around the cylindrical axis of the glass tube; and stopping turning the first and second drive knobs, when the maximum light intensity emitted from the GRIN lens is obtain.

10. The method for aligning an optical collimator as claimed in claim 9, further comprising the step of forming a glue between the GRIN lens and the glass tube; and curing the glue between the GRIN lens and the glass tube after obtaining maximum light intensity emitted from the GRIN lens.

11. The method for aligning an optical collimator as claimed in claim 10, wherein the glue is provided with a UV-curing epoxy, and a UV-emitter is provided for curing the glue.

12. The method for aligning an optical collimator as claimed in claim 10, wherein the glue is provided with a heat-curing epoxy, and an oven is provided for curing the glue.

13. The method for aligning an optical collimator as claimed in claim 9, wherein the light source is provided with a variable laser source and a power meter is provided for measuring the light intensity emitted from the GRIN lens.

* * * * *